F. W. HOLTZ.
AUTO WHEEL.
APPLICATION FILED JAN. 19, 1914.

1,125,324.

Patented Jan. 19, 1915.

2 SHEETS—SHEET 1.

Witnesses
Edwin B. Hunt
C. Clark

Inventor
F. W. Holtz
by H. B. Willson & Co.
Attorneys

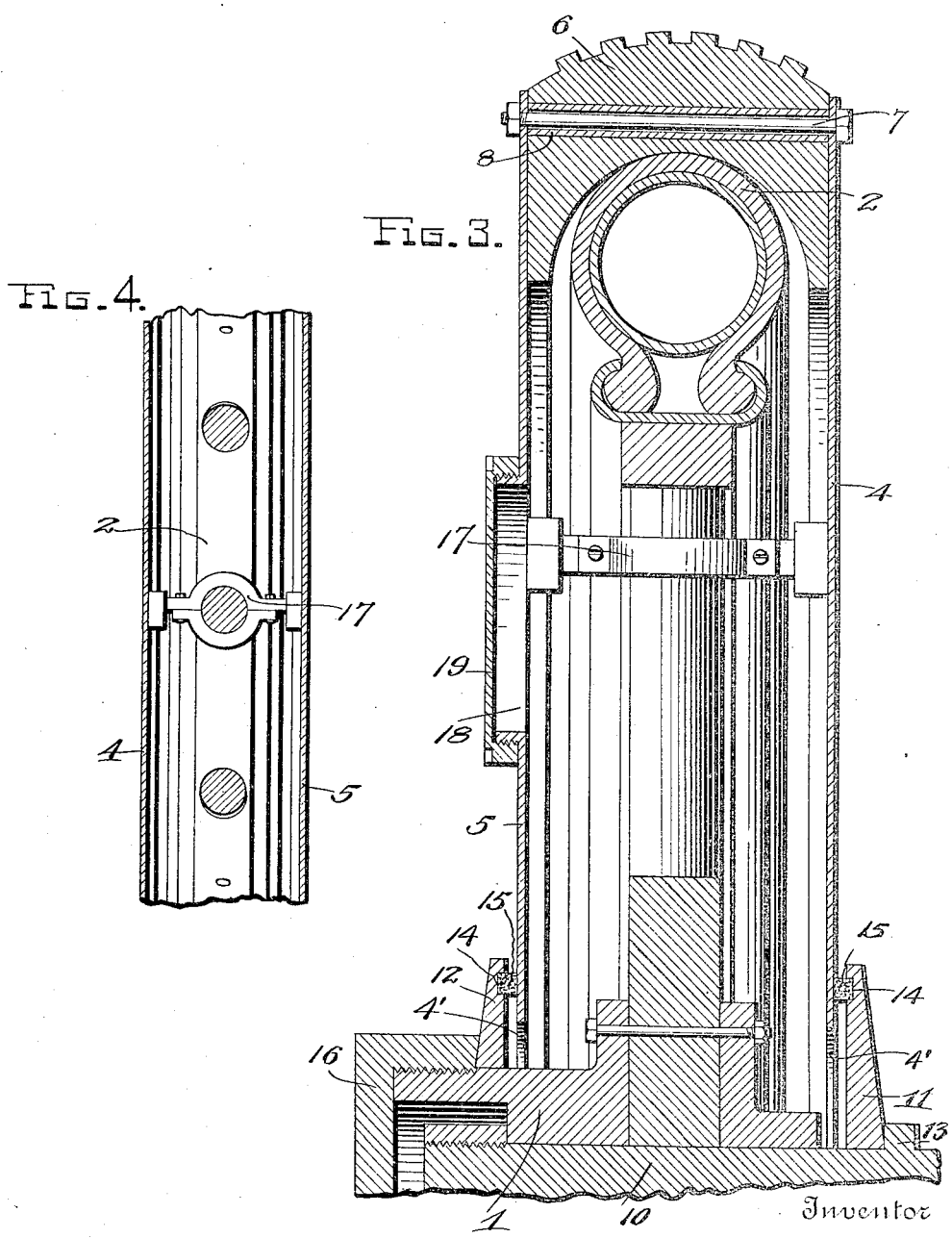

UNITED STATES PATENT OFFICE.

FREDERICK W. HOLTZ, OF CHICAGO, ILLINOIS.

AUTO-WHEEL.

1,125,324.   Specification of Letters Patent.   Patented Jan. 19, 1915.

Application filed January 19, 1914. Serial No. 813,001.

*To all whom it may concern:*

Be it known that I, FREDERICK W. HOLTZ, a citizen of the United States, residing at Chicago, in the county of Cook and State of Illinois, have invented certain new and useful Improvements in Auto-Wheels; and I do declare the following to be a full, clear, and exact description of the invention, such as will enable others skilled in the art to which it appertains to make and use the same.

My invention relates primarily to cushioned vehicle wheels, but more especially to that class of the latter in which the wheel is entirely inclosed by a metallic casing.

One object of my invention is to provide a wheel structure of this character which possesses all the resilient advantages of the pneumatic tire without the attendant disadvantages and annoyances from punctures, etc., incident to the use of the latter.

Another important object of the same is to provide a device of this kind in which there is a differential rotary movement between the casing and wheel disposed therein.

A still further object is to provide a unique dust and fluid tight connection between the casing and the axle and hub.

A still further object is to provide such a connection between the casing and the axle and hub, as will permit free movement of the casing in all directions.

Another object is to provide a novel means for retaining the wheel centrally located within the casing.

With these and other objects in view, my invention consists of certain novel combinations and arrangement of parts which will be more particularly pointed out and claimed.

Figure 1:
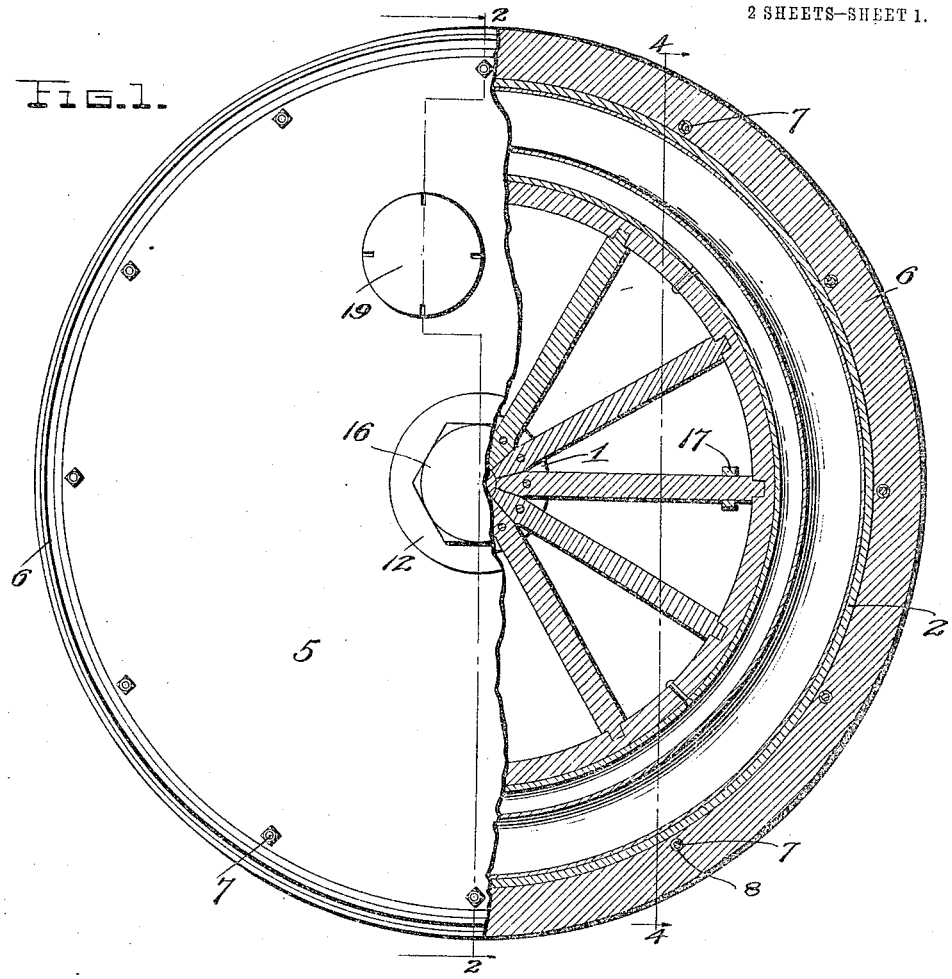
Figure 2:
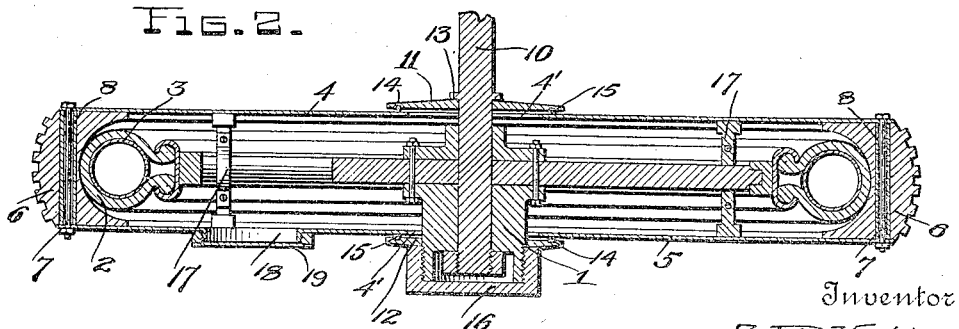

In the accompanying drawings, in which similar numerals indicate corresponding parts, Figure 1 is a side view partly in section with the side plate partly broken away; Fig. 2 is a transverse irregular sectional view taken on the line 2—2 of Fig. 1; Fig. 3 is a similar view of half the wheel on an enlarged scale; and Fig. 4 is a detail sectional view taken on the line 4—4 of Fig. 1, illustrating the arrangement and construction of the wheel centralizers.

Referring more particularly to the drawings, 1 indicates the hub of a standard automobile wheel, 2, provided with an ordinary pneumatic tire 3. The numeral 4 indicates the inner annular plate of my improved casing which is disposed on the inner side of the wheel and formed with a centrally arranged opening 4', the latter having a diameter slightly greater than that of the hub 1. The opposite side of the wheel is provided with a similarly shaped plate 5, having an opening 4', whose diameter corresponds to that of the opening in the plate 4. These plates are constructed of sheet metal so as to readily withstand the jars incident to heavy traveling.

Between the outer portions of the plates 4 and 5 immediately above the tire 2, in order that the latter may have a rolling contact therewith, I provide a rubber tread 6 which is retained in position by the threaded bolts 7, passing therethrough and through the casing; the bolts 7 being retained in position by any appropriate means.

To prevent any unnecessary wear on the tread which might arise from the turning of the bolts therein, the latter are incased in cylindrical or oblong tubes 8 which are passed through the bolt openings in the tread, as clearly shown in Fig. 3.

For the provision of a dust and fluid proof connection between the inner portion of the plates 4 and 5, the axle 10 and hub 1, I utilize two metallic disks 11 and 12, which I shall, for the sake of convenience, designate as inner and outer plates, respectively.

The inner plate 11 whose diameter is slightly greater than that of the opening 4' in plate 4, when placed on the axle 10 which passes through the centrally arranged opening therein and brought into contact with the shoulder 13 formed by the reduced portion of the axle, will entirely cover the opening in the inner plate 4. This disk in effect forms a solid cover for the inner side of the wheel, as can be clearly seen in Fig. 2. The other disk 12 is similar in every respect to the plate 11 with the exception of the central opening which is a trifle larger to permit the enlarged end of the hub to be passed therethrough. To form the hereinbefore mentioned dust and fluid tight connection between the disks 11 and 12 and plates 4 and 5, I form an annular channel 14, on the outer portion of each disk, and fill the former with the packing 15. While this arrangement, it will be seen, forms a perfect dust and fluid proof connection between the plates and disks, nevertheless it does not interfere in any way with the free movement of the plates 4 and 5. A cap 16 threaded on the outer end of hub 1, holds the disks and plates in proper position upon the wheel.

To maintain the wheel 2 in a central position within the casing formed by plates 4 and 5, I employ what I may call centralizers 17, which are clamped to two or more of the spokes, composed of two sections a spacing member 17' and a retaining member 17''. The former has its central portion semicircular in configuration to substantially conform to the shape of the spoke, and carries at its extremities two bearing blocks 20 which bear against the inner faces of the plates 4 and 5 thereby continuously retaining the wheel in central position. The retaining member has a similarly shaped central portion, while its laterally projecting portions are provided with apertures which when the two members are placed together upon the spokes will register with the apertures formed in member 17', permitting the passage of the bolts 21 through said members whereby the latter can be securely retained in position upon the spokes as shown in Fig. 4.

In order to give access to the wheel 2 after the latter has been incased, I provide an opening 18 in the outer plate 5, and form said opening with a threaded flange around its edge to receive a cap 19, as clearly shown in Fig. 3.

From the foregoing, it will be seen that while I have completely incased the wheel 2, nevertheless, the latter is perfectly free to rotate therein, thus establishing a differential movement between the wheel and casing. Heretofore, it has been customary to secure the wheel to the casing, but experience has disclosed the fact that if the wheel and casing are allowed to move separately, the former merely having a rolling contact with the latter, an enormous amount of wear and strain is avoided, because when the wheel and casing are fixed, there is a constant tendency on the part of the latter to creep, that is, move about the periphery of the wheel which causes considerable strain on the various parts thereof, whereas, when the casing and wheel are not connected in any way, the former is not only free to move around the wheel avoiding the strain mentioned above, but it may also have a rectilinear movement so that when the wheel meets an obstruction in the road, the entire casing will yield and press against the incased pneumatic tire, hence giving my improved wheel the resiliency of the ordinary unincased wheel without any of the disagreeable features connected with the same.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim as my invention:—

In a device of the character set forth the combination with an axle having flanges spaced from its extremities, a wheel, a pneumatic tire thereon, inner and outer plates disposed on opposite sides of the wheel, each of said plates having an opening centrally arranged therein, inner and outer disks to cover the openings in said inner and outer plates respectively, said disks each having a channel formed in the inner faces thereof contiguous to their outer edges, packing disposed within said channels, and a tread secured between the outer edges of said inner and outer plates; of a centralizing clamp secured to the spokes of said wheel and including two members one of the latter being arcuately shaped intermediate its ends to substantially conform to half the circumference of one of said spokes, guiding blocks secured to the extremities of said member for maintaining said wheel in predetermined relation with respect to said inner and outer plates, the other member of said clamp being arcuately shaped intermediate its ends to conform to the remaining half of said spoke, said last mentioned member having therein openings formed at its extremities adapted to register with openings formed in the first mentioned part of said clamp and means passing through said openings whereby to maintain the parts of said clamp in adjusted position.

In testimony whereof I have hereunto set my hand in presence of two subscribing witnesses.

FREDERICK W. HOLTZ.

Witnesses:
SAMUEL O. OLIN,
C. OSCAR OLIN.

Copies of this patent may be obtained for five cents each, by addressing the "Commissioner of Patents, Washington, D. C."